(12) United States Patent
Li (10) Patent No.: US 12,332,506 B2
(45) Date of Patent: Jun. 17, 2025

(54) WEARABLE DEVICE AND EARBUD

(71) Applicant: MERRY ELECTRONICS (SHENZHEN) CO., LTD., Guangdong (CN)

(72) Inventor: Hung-Yuan Li, Taichung (TW)

(73) Assignee: MERRY ELECTRONICS (SHENZHEN) CO., LTD., Guangdong (CN)

( * ) Notice: Subject to any disclaimer, the term of this patent is extended or adjusted under 35 U.S.C. 154(b) by 1052 days.

(21) Appl. No.: 17/195,662

(22) Filed: Mar. 9, 2021

(65) Prior Publication Data
US 2021/0405395 A1  Dec. 30, 2021

(30) Foreign Application Priority Data
Jun. 30, 2020  (TW) ................ 109122117

(51) Int. Cl.
G02C 11/00 (2006.01)
H04R 1/10 (2006.01)

(52) U.S. Cl.
CPC ........... *G02C 11/10* (2013.01); *H04R 1/1041* (2013.01); *H04R 1/1058* (2013.01); *H04R 1/1091* (2013.01)

(58) Field of Classification Search
CPC .... G02C 11/10; G02C 11/06; G02C 2200/02; G02C 2200/04; G02C 2200/06; G02C 2200/22; H04R 1/1041; H04R 1/4058; H04R 1/028; H04R 1/1016; H04R 1/10; H04R 1/16; H04R 25/60; H04R 25/603; H04R 25/604; H04R 25/609; H04R 25/65; H04R 25/652; H04R 25/75; G04G 21/02

USPC .......................................... 351/158
See application file for complete search history.

(56) References Cited

U.S. PATENT DOCUMENTS

| 2013/0127980 A1* | 5/2013 | Haddick ................. G06F 3/013 348/14.08 |
| 2014/0103199 A1* | 4/2014 | Loong .................... G01S 7/4813 250/214.1 |
| 2016/0278647 A1* | 9/2016 | Vogel .................... A61B 5/6817 |
| 2017/0241827 A1* | 8/2017 | Heo ........................ G01L 1/044 |
| 2018/0203570 A1* | 7/2018 | Franke .................. G06F 3/0418 |
| 2019/0098390 A1* | 3/2019 | Carino ................... H04R 5/033 |

FOREIGN PATENT DOCUMENTS

CN 108141657 A * 6/2018 ........... A61B 5/6803

OTHER PUBLICATIONS

Translation CN108141657 (Year: 2016).*

* cited by examiner

Primary Examiner — Travis S Fissel
(74) Attorney, Agent, or Firm — CKC & Partners Co., LLC (57) ABSTRACT

A wearable device includes a main body, a detection module and a controller. The detection module is located on the main body and includes an upper casing, an opposite lower casing and a proximity sensor. The lower casing has an elastic material. The proximity sensor is located on the upper casing to measure a distance from the proximity sensor to the elastic material. The controller is electrically connected to the detection module. The elastic material has a contact surface for the user to contact when the wearable device is worn on the user, thereby switching between an active mode and a standby mode of the wearable device. In addition, the present disclosure further includes an earbud.

9 Claims, 9 Drawing Sheets

WEARABLE DEVICE AND EARBUD

RELATED APPLICATIONS

This application claims priority to Taiwan Application Serial Number 109122117, filed Jun. 30, 2020 which is herein incorporated by reference in its entirety.

BACKGROUND

Field of Disclosure

The present disclosure relates to wearable devices and earbuds.

Description of Related Art

With the advancement of technology, various wearable devices that can be worn on users have become more common, such as smart watches, smart glasses, and so on. These wearable devices must be able to sense whether the user is using the wearable device in order to switch between different operating modes in real time, or intelligently enter standby mode to reduce power consumption.

Therefore, one of the problems that those skilled in the related art want to solve is how to provide a wearable device that can sense whether the user is wearing it in real time with low power consumption and is not easily false triggered.

SUMMARY

An aspect of the present disclosure is related to a wearable device.

According to one embodiment of the present disclosure, a wearable device includes a main body, a detection module and a controller. The detection module is located on the main body. The detection module includes a proximity sensor, an upper casing and an opposite lower casing. The lower casing has an elastic material. The proximity sensor is located on the upper casing to measure a distance from the proximity sensor to the elastic material. The controller is electrically connected to the detection module. The elastic material has a contact surface for a user to contact when the wearable device is worn on the user, thereby switching between an active mode and a standby mode of the wearable device.

In one or more embodiments, an elastic coefficient of the elastic material is different from an elastic coefficient of other portions of the lower casing beyond the elastic material.

In one or more embodiments, the elastic material is squeezed to approach the proximity sensor when the wearable device is worn on the user, so that a distance between the elastic material and the proximity sensor is reduced.

In one or more embodiments, the detection module further includes a light reflection layer. The light reflection layer is located on the elastic material. The proximity sensor is aligned with the light reflection layer.

In some embodiments, the proximity sensor has a light emitter and a light detector, the light emitter and the light detector faces the elastic material.

In some embodiments, the detection module further includes a timing unit configured to measure a plurality of measurement times spent by a plurality of measurement histories by a time interval and correspondingly convert the measurement times to a plurality of measurement data. A single one of the measurement histories is defined as a light emitted from the light emitter and reflected by the elastic material to the light detector.

In some embodiments, the detection module is configured to determine a first threshold and a second threshold greater than the first threshold to define active mode and the standby mode of the wearable device. The wearable device switches to the active mode to operate when at least one of the measurement data is greater than the second threshold. The wearable device switches to the standby mode to operate when at least one of the measurement data is less than the first threshold during the active mode.

In some embodiments, the controller is configured to determine a first continuous time and a second continuous time. The wearable device switches to the active mode when any of the measurement data are greater than the second threshold during the first continuous time. The wearable device switches to the standby mode when any of the measurement data are less than the first threshold during the second continuous time.

In some embodiments, the time interval is configured to be selected from a first measurement interval and a second measurement interval less than the first measurement interval by the controller. The controller is configured to select the first measurement interval as the time interval when the wearable device is during the standby mode. The controller is configured to select the second measurement interval as the time interval when at least one of the measurement data is greater than the second threshold during the standby mode until the wearable device switches to the standby mode from the active mode.

In one or more embodiments, the main body further includes a glasses frame which is worn on the user, and the glasses frame has two temples arranged on both sides of a face of the user and two temple tips respectively extended from the two temples to abut against ears of the user. The detection module is located on one of the two temples and the two temple tips.

In some embodiments, an overall thickness of the detection module is less than or equal to a thickness of one of the two temples and the two temple tips.

In some embodiments, the controller is disposed in the two temples and connected to the detection module through a flexible circuit board.

Another aspect of the present disclosure is related to an earbud.

According to one embodiment of the present disclosure, an earbud includes a casing, a speaker, a detection module and a controller. The speaker is located in the casing to output audio signal. The detection module is located on the casing. The detection module includes an elastic material and a proximity sensor. The elastic material is located on the casing. The proximity sensor located on a support portion in the casing to measure a distance from the proximity sensor to the elastic material. The proximity sensor is aligned with the elastic material. The controller is located in the casing and electrically connected to the detection module. The elastic material has a contact surface for a user to contact when the earbud is worn on the user, thereby switching between an active mode and a standby mode of the earbud.

In one or more embodiments, the casing includes a body portion and an insertion portion connected to each other. The detection module is located on the casing and disposed at a junction between the body portion and the insertion portion.

In one or more embodiments, the elastic material is squeezed to approach the proximity sensor when the earbud is worn on the user, so that a distance between the elastic material and the proximity sensor is reduced.

In one or more embodiments, the proximity sensor has a light emitter aligned with the elastic material and a light detector.

In some embodiments, the detection module further includes a timing unit configured to measure a plurality of measurement times spent by a plurality of measurement histories by a time interval and correspondingly convert the measurement times to a plurality of measurement data. A single one of the measurement histories is defined as a light emitted from the light emitter and reflected by the elastic material to the light detector.

In some embodiments, the detection module is configured to determine a first threshold and a second threshold greater than the first threshold to define the active mode and the standby mode of the earbud. The earbud switches to the active mode to operate when at least one of the measurement data is greater than the second threshold. The earbud switches to the standby mode to operate when at least one of the measurement data is less than the first threshold during the active mode.

In summary, novel wearable device and earbud are provided in the present disclosure. The novel wearable device and earbud are switched between an active mode and a standby mode through a novel detection module, and power consumption can be reduced. By setting the first threshold and the second threshold, false triggering of the earbud and earbud due to walking or other vibrations can be avoided.

It is to be understood that both the foregoing general description and the following detailed description are by examples, and are intended to provide further explanation of the invention as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

The phrases "first," "second," etc., are solely used to separate the descriptions of elements or operations with the same technical terms, and are not intended to convey a meaning of order or to limit the disclosure.

Additionally, the phrases "comprising," "includes," "provided," and the like, are all open-ended terms, i.e., meaning including but not limited to.

Further, as used herein, "a" and "the" can generally refer to one or more unless the context particularly specifies otherwise. It will be further understood that the phrases "comprising," "includes," "provided," and the like used herein indicate the stated characterization, region, integer, step, operation, element and/or component, and does not exclude additional one or more other characterizations, regions, integers, steps, operations, elements, components and/or groups thereof.

The wearable device of the present disclosure includes a main body and a detection module. The main body includes objects that can be worn by the user, including wristbands, watches, glasses, earbuds, etc., but not limited to the present disclosure. By arranging a detection module of the present disclosure on the wearable device to be worn by users, the detection module can sense whether the user wears wearable device in real time, thereby switching the wearable device to an active mode to enable the wearable device performing the main function.

Figure 1A:
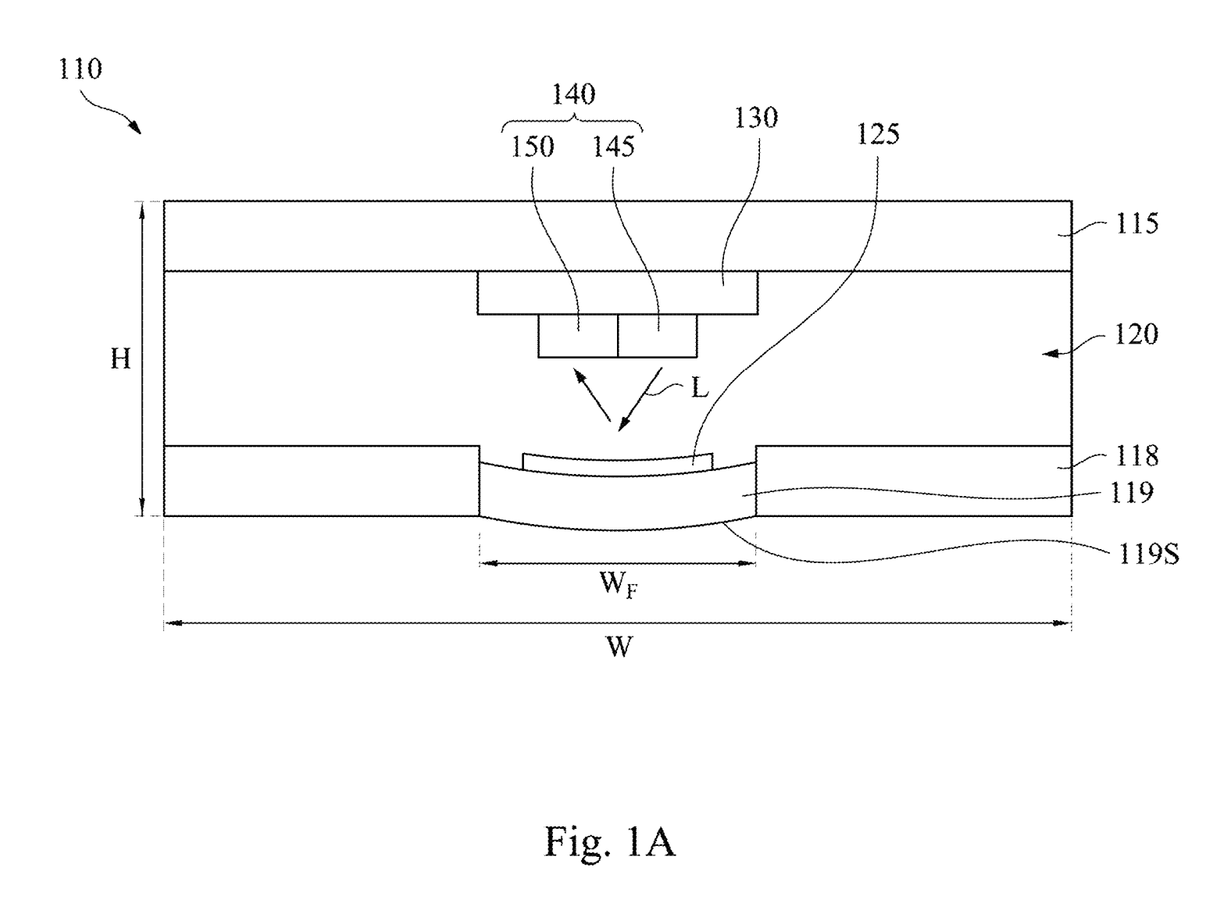
FIG. 1A illustrates a schematic cross-section view of a detection module according to one embodiment of the present disclosure.

FIG. 1A illustrates a schematic cross-section view of a detection module 110 according to one embodiment of the present disclosure. As shown in FIG. 1A, in this embodiment, the detection module 110 includes an upper casing 115, a lower casing 118 opposite to the upper casing 115, an elastic material 119 located on the lower casing 118, a circuit board 130 located on the upper casing 115 and aligned with the elastic material 119 and a proximity sensor 140 located on the circuit board 130. The proximity sensor 140 faces the elastic material 119. The opposite upper casing 115 and lower casing 118 define a chamber 120. The circuit board 130 and the proximity sensor 140 are located in the chamber 120.

The circuit board 130 can be a flexible circuit board. The circuit board 130 can be provided with elements having functions beyond the proximity sensor 140. Additionally, the detection module 110 of the present disclosure can further include the controller 165 electrically connected to the proximity sensor 140 (details shown in following FIG. 2).

The proximity sensor 140 is configured to measure a distance between the proximity sensor 140 and the elastic material 119. In this embodiment, the proximity sensor 140 consists of an infrared emitter 145 and an infrared sensor 150, and the infrared emitter 145 is aligned with the elastic material 119 to emit infrared light L to the elastic material 119. The infrared light L is reflected to the infrared sensor 150 aligned with the elastic material 119 by the elastic material 119.

As shown in FIG. 1A, in this embodiment, a light reflection layer 125 is further located on the elastic material 119 to reflect the infrared light L.

The detection module of the present disclosure can include a light emitter and a light detector. In this embodiment, the infrared emitter 145 is used as the light emitter and the infrared sensor is used as the light detector, so that emitted light used for detection is infrared light L. However, this embodiment is not limited types of the light emitter and the light detector of the present disclosure. People in relevant fields can select light beyond the infrared light to detect changing of the distance by refection. In addition, this embodiment is not limited types of the proximity sensor 140, and the present disclosure would include other elements that can realize the sensing of the distance between the elastic material 119 and the proximity sensor 140.

In this embodiment, the light reflection layer 125 is a colored material, so as to effectively reflect infrared light. The light reflection layer 125 of colored material includes, for example, a white tape or a dark tape, but is not limited thereto. The colored tape can be provided on the elastic material 119 in the chamber 120 by means of attachment. As shown in FIG. 1A, since the light reflection layer 125 is an adhesive tape, the light reflection layer 125 is close to the elastic material 119 and can be bent in response to changes of the elastic material 119.

In some embodiments, the elastic material 119 can be made of material that facilitate reflection to directly reflect the infrared light L emitted by the infrared emitter 145 without disposing the light reflection layer 125. For example, in some embodiments, the elastic material 119 with a dark color can be selected. In some embodiments, an elastic material 119 close to black is selected.

In some embodiments, if there is no interference from other light sources, the proximity sensor 140 (for example, including the infrared emitter 145 and the infrared sensor 150) does not have to be disposed in the enclosed chamber 120, but may be disposed in an open space. In other words, the upper casing 115 and the lower casing 118 do not necessarily form a closed chamber 120 if there is no interference from other light sources.

An elastic coefficient of the elastic material 119 is different from an elastic coefficient of other portions of the lower casing 118 beyond the elastic material 119. In this embodiment, the elastic material 119 has an elastic coefficient less than the an elastic coefficient of other portions of the lower casing 118 beyond the elastic material 119, so that the elastic material 119 is easier to be deformed by force than other portions of the lower casing 118 beyond the elastic material 119. In some embodiments, material of the elastic material 119 is different from the material of the lower casing, so that the elastic coefficient of the elastic material 119 is different from the elastic coefficient of the lower casing 118 beyond the elastic material 119. In some embodiments, the elastic material 119 and the lower casing 118 are the same material with different thicknesses and have different elastic coefficients. For details, please refer to following FIG. 1B.

As shown in FIG. 1A, in this embodiment, the elastic material 119 protrudes from a bottom of the lower casing 118. The elastic material 119 has a contact surface 119S exposed from the bottom of the lower casing 118, so that the contact surface 119S can be contacted with the user when the user wears a device with the detection module 110. Then, the user can apply force to the elastic material 119 from outside the chamber 120, so that the elastic material 119 is deformed and a distance between the elastic material 119 and the proximity sensor 140 is reduced. In some embodiments, a shape of the elastic material 119 on the lower casing 118 is a plane, and the elastic material 119 does not protrude from the bottom of the lower casing 118, and the elastic material 119 is deformed and recessed into the chamber 120 after the user applies force, so that a distance between the elastic material 119 and the proximity sensor 140 is reduced. It should be noted that other configurations that reduce the distance due to wearing are also within the scope of the present disclosure. In some embodiments, the elastic material 119 and the lower casing 118 are integrally formed. In some embodiments, an opening can be provided in the lower casing 118, and the elastic material 119 can be placed in the opening of the lower casing 118.

Figure 1B:
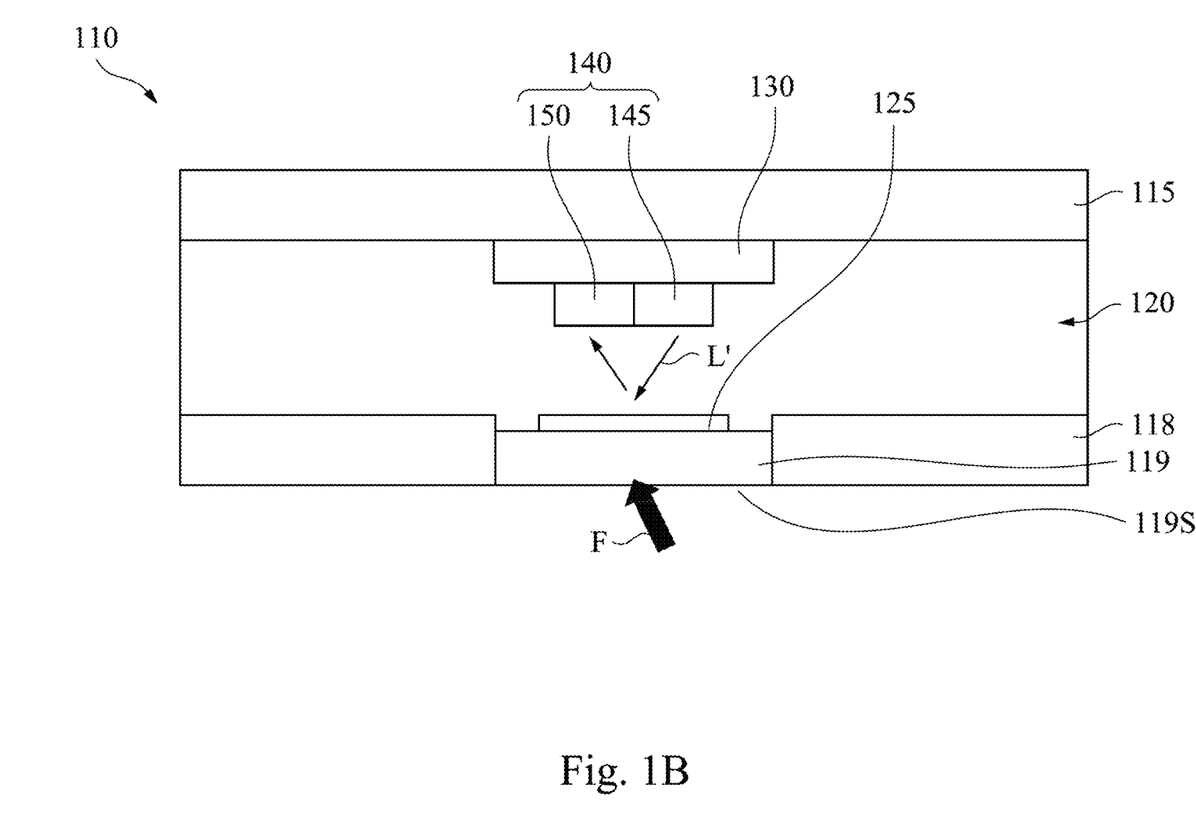
FIG. 1B illustrates a schematic view that the detection module of FIG. 1A detects a force signal.

Reference is made in FIG. 1B to further describe the operations of the detection module 110. FIG. 1B illustrates a schematic view that the detection module 110 of FIG. 1A detects a force signal.

As shown in FIG. 1B, for the detection module 110 of the present disclosure, since the elastic material 119 protrudes from the bottom of the lower casing 118, once the user touches the detection module 110 from the lower casing 118, the user would inevitably touch the contact surface 119S of the elastic material 119 first and apply force F on the contact surface 119S, so that the elastic material 119 is deformed by the force F. At the same time, since the lower casing 118 has different elastic coefficient with respect to the elastic material 119, the lower casing 118 is less deformed or even not deformed, as shown in FIG. 1B.

Once the elastic material 119 is deformed by the force F, the distance between the proximity sensor 140 and the elastic material 119 changes. Correspondingly, the path taken by the infrared light L' emitted by the infrared emitter 145 and reflected to the infrared sensor 150 in FIG. 1B takes less time than the path taken by the infrared L in FIG. 1A. Accordingly, it can be determined whether the user applies force F to the detection module 110 of a device of the present disclosure. When the user wears the wearable device with the detection module 110, the elastic material 119 is squeezed and close to the proximity sensor 140, so that the distance between the elastic material and the proximity sensor 140 is reduced. Therefore, it can be determined whether the user wears the wearable device of the present disclosure.

In some embodiments, the upper casing 115 and the lower casing 118 can include a mixed material of polycarbonate (PC) and acrylonitrile-butadiene-styrene (ABS), and the mixed material can have a great hardness and elastic coefficient. The elastic material 119 can be selected from the group consisting of Thermoplastic elastomer (TPE), Thermoplastic polyurethane (TPU), Thermoplastic rubber (TPR) or other materials capable of greater elastic deformation than the lower casing 118.

Please return to FIG. 1A. In this embodiment, each of the upper casing 115 and the lower casing 118 can have a thickness of about 1 mm, so that the overall thickness of the detection module 110 can be greater than 2 mm. A distance between the upper casing 115 and the lower casing 118 corresponds to the distance between the proximity sensor 140 and the elastic material 119, so that the accuracy of the detection module 110 are related the distance between the upper casing 115 and the lower casing 118. A greater distance between the upper casing 115 and the lower casing 118 should better detect the deformation of the elastic material 119, but would also increase the overall thickness H of the detection module 110. Therefore, the overall thickness H of the detecting module 110 can be designed based on the type of the main body to be installed.

On the other hand, as shown in FIG. 1A, in this embodiment, the thickness of the elastic material 119 is less than the thickness of the lower casing 118. For example, the thickness of the lower casing 118 is 1 mm, and the thickness of the elastic material 119 may be in a range from 0.6 mm to 1.0 mm. In addition, for the case where the main body of the wearable device is a glasses frame, the width $W_F$ of the elastic material 119 can be configured to about 3 mm, but it is not limited to the present disclosure. The width $W_F$ of the elastic material 119 of the lower casing 118 is about 3 mm, which can surely contact the ears of the user when worn. Correspondingly, in some embodiments, the overall width of the detection module is greater than 3 mm but not limited to the present disclosure.

Figure 2:
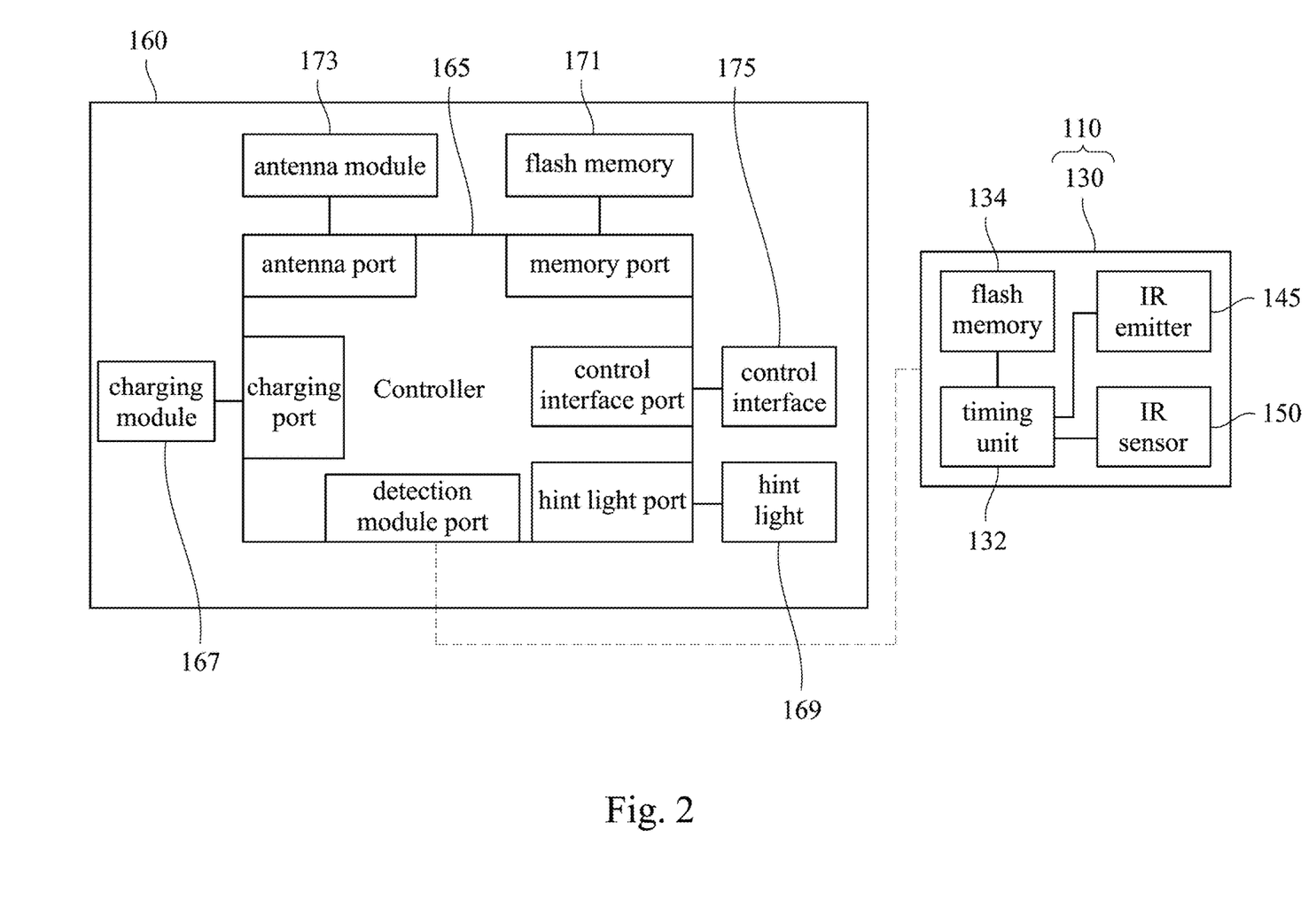
FIG. 2 illustrates a block diagram that a circuit board of a detection module is connected to a micro controller board according to one embodiment of the present disclosure.

FIG. 2 illustrates a block diagram that a circuit board 130 of the detection module 110 is connected to a micro controller board 160 according to one embodiment of the present disclosure. As shown in FIG. 1, the circuit board 130 is located on the upper casing 115 of the detection module 110. In FIG. 2, the circuit board 130 is substantially connected to the micro control board 160 to electrically connect to the controller 165 on the micro control board 160.

As shown in FIG. 2, in this embodiment, the circuit board 130 has a flash memory 134 and a timing unit 132 connected to each other. The timing unit 132 is connected to the infrared emitter 145 and the infrared sensor 150 respectively. The timing unit 132 can be used to record the time taken from the infrared emitter 145 emitting infrared light (such as infrared light L or L') to the infrared sensor 150 receiving infrared light, and the time would be recorded in the flash memory 134. In some embodiments, the flash memory 134 and the timing unit 132 can be substantially integrated into a microcontroller unit.

Once the elastic material 119 is applied with force and deformed, the distance between the elastic material 119 and the proximity sensor 140 would also be changed. For example, the path of the infrared light L in FIG. 1A is different from the path of the infrared light L'. The changed distance between the elastic material 119 and the proximity sensor 140 would cause the record time recorded by the timing unit 132 being different, so that the change in the distance between the elastic material 119 and the proximity sensor 140 can be reflected in the time recorded by the timing unit 132.

Therefore, the timing unit 132 can be used to measure a plurality of measurement times spent by a plurality of measurement histories by a time interval and correspondingly convert the measurement times into measurement data. In this embodiment, a single one of the measurement histories is defined as an infrared light emitted from the infrared emitter 145 and reflected to the infrared sensor 150 through the elastic material 119. The measurement data obtained by the timing unit 132 is a countdown of infrared reflection data. When the infrared emitter 145 emits infrared light, the timing unit 132 starts counting down from a preset value until the infrared sensor 150 receives the reflected infrared light and stops the countdown to obtain corresponding infrared reflection data.

Each measurement history can occur every time interval. For example, if the time interval is configured to 1 second, during the first ($1^{st}$) second, a first infrared reflection data is defined as an infrared light emitted by the infrared emitter 145 is received by the infrared sensor 150 and recorded. After a one-second interval and during the second ($2^{nd}$) second, a second infrared reflection data is defined as an infrared light emitted by the infrared emitter 145 is received by the infrared sensor 150 and recorded.

In this embodiment, an infrared reflection data is defined by a countdown operation. Therefore, an infrared (IR) reflection data is a less value if the distance between the proximity sensor 140 and the elastic material 119 is greater since the path passed by the infrared light L is greater and the timing unit 132 would count down more time, as shown in FIG. 1A. Similarly, in FIG. 1B, the elastic material 119 is deformed by the force F, so that the distance between the proximity sensor 140 and the elastic material 119 is reduced, the path of the infrared light L' is less, and the timing unit 132 would count down less, thereby obtaining a greater infrared reflection data.

In this embodiment, the micro control board 160 is provided with a controller 165, a charging module 167, a hint light 169, a flash memory 171, an antenna module 173, and a control interface 175. The controller 165 is electrically connected to the detection module 110 through the detection module port to receive measurement data (i.e. Infrared reflection data) provided by the timing unit 132 to sense whether the user is wearing the wearable device of the present disclosure, for example. In this embodiment, the controller 165 is a Bluetooth chip but not limited to the present disclosure.

The controller 165 is connected to the charging module 167 through a charging port. The controller 165 is connected to the charging module 167 through a charging port to obtain power through an external power source or the like. The controller 165 is connected to the hint light 169 through the hint light port. The hint light 169 is used to show the current state of the wearable device of the present disclosure for the user, such as charging, standby mode, active mode, and so on. The controller 165 is connected to the flash memory 171 through a memory port to receive the time change signal generated by one or more force from the detection module 110. The controller 165 is connected to the antenna module 173 through the antenna port to receive other external signals. For example, the antenna module 173 includes a Bluetooth antenna, such as a 2.4 G Bluetooth antenna. The controller 165 is also connected to the control interface 175 through the control interface port. The control interface 175 can be provided with a plurality of physical buttons or touch control surfaces, and the user can actively control the wearable device of the present disclosure through the control interface 175.

Figure 3:
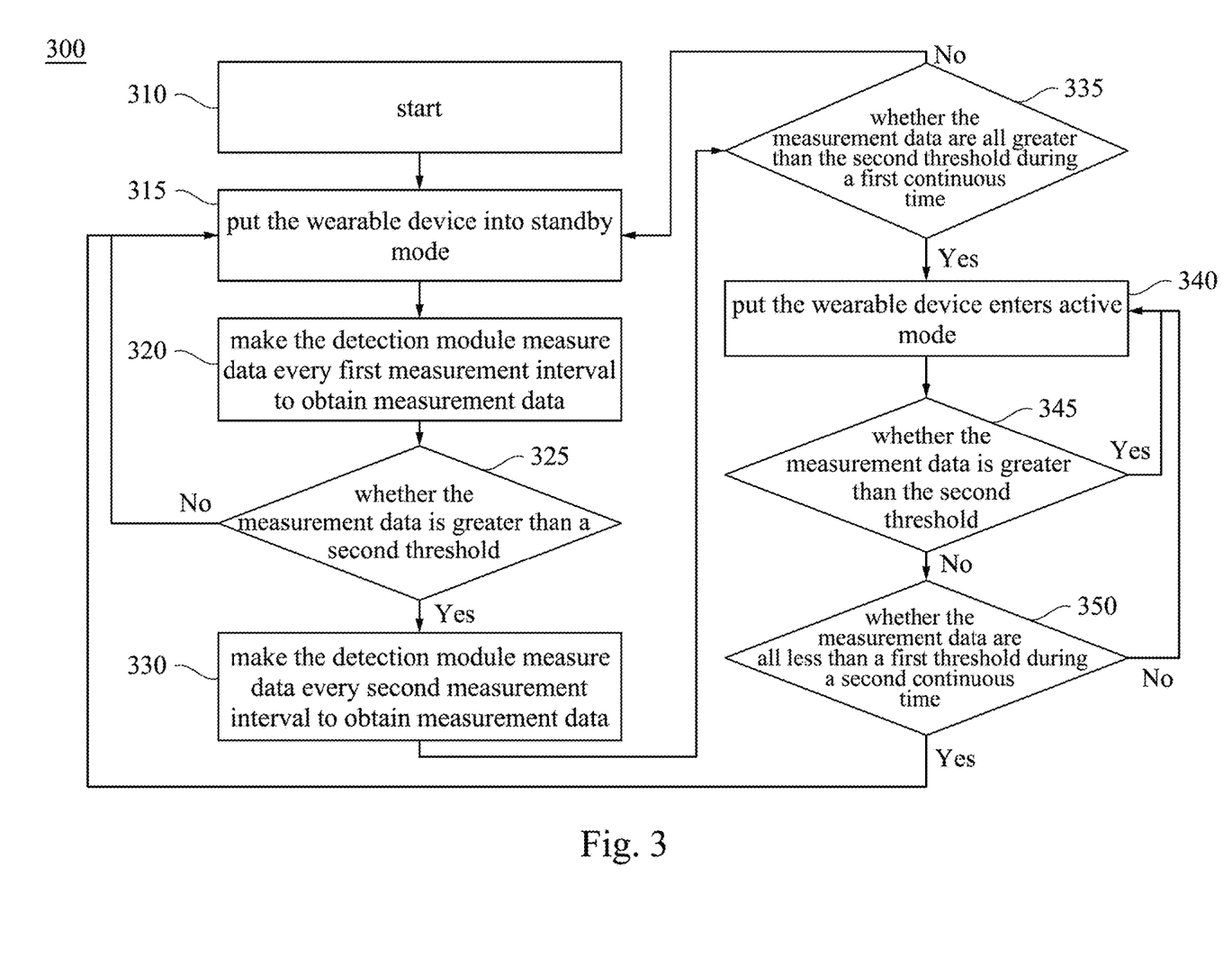
FIG. 3 illustrates a flow chart of a controlling method used for a wearable device according to one embodiment of the present disclosure.
Figure 4:
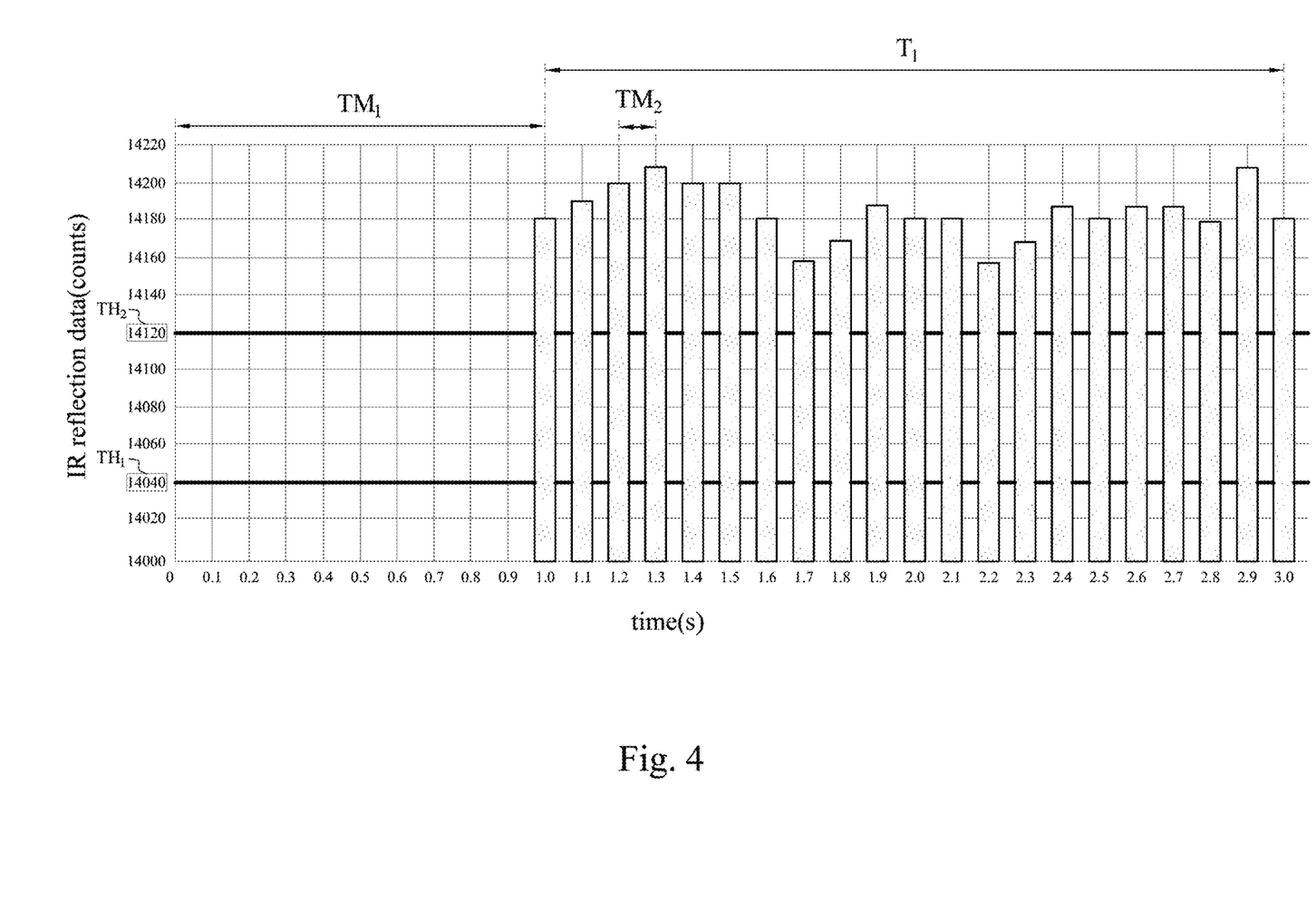
FIGS. 4 to 6 respectively illustrate the relationship between different infrared reflection data and time corresponding to different force signals detected by a detection module of the present disclosure.
Figure 5:
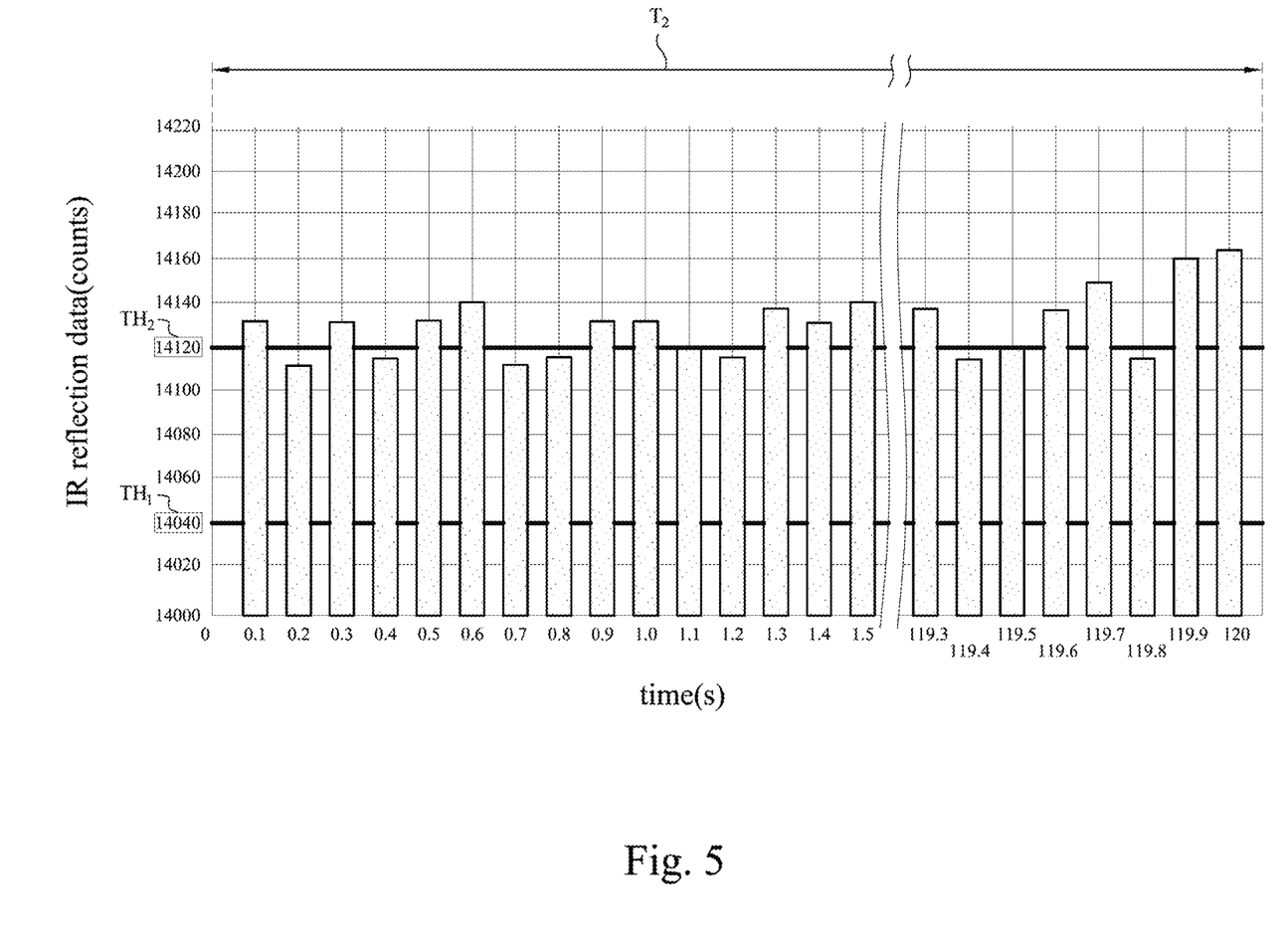
Figure 6:
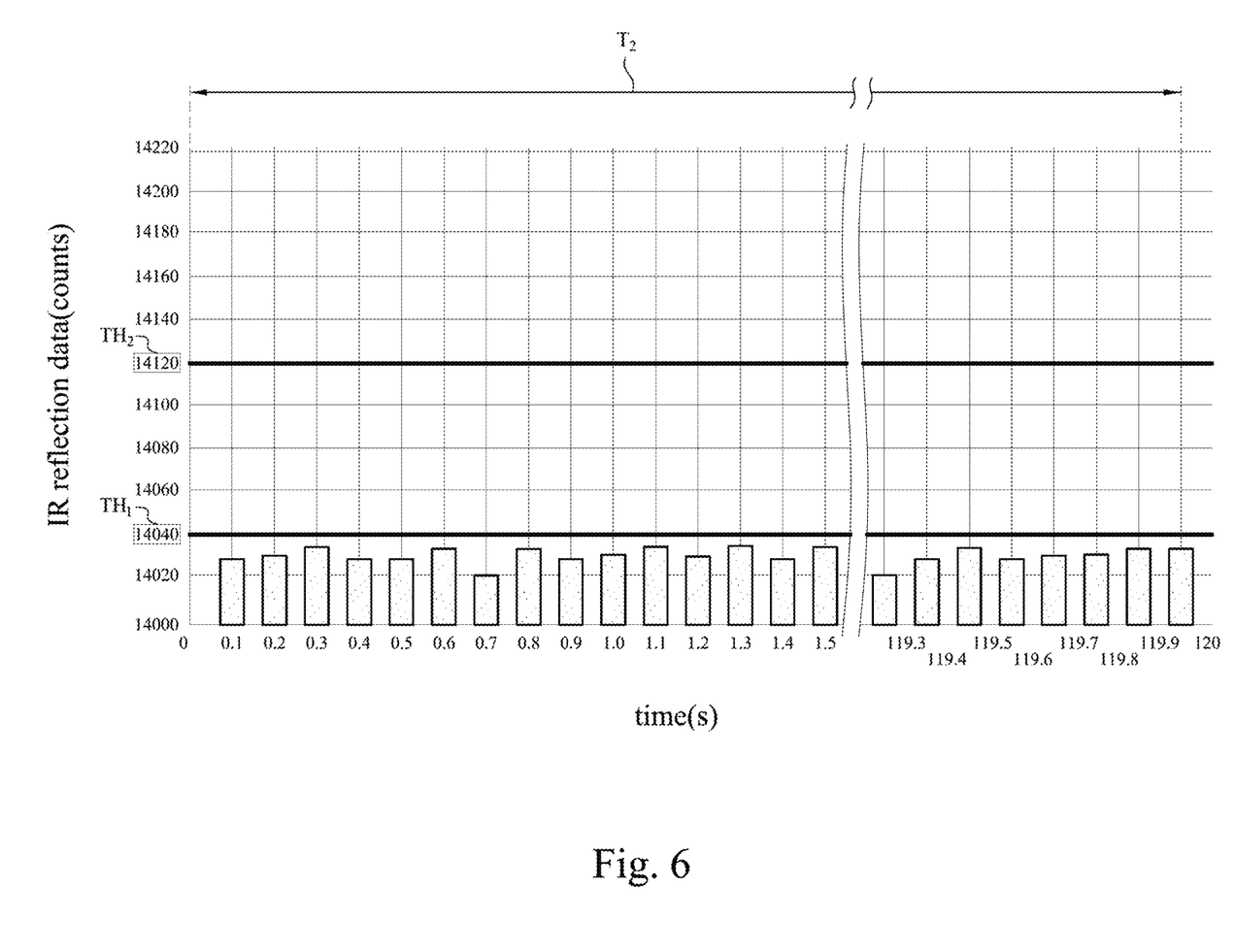

To further illustrate that how the controller 165 receive the time change signal of the detection module 110 and controls the wearable device of the present disclosure, please refer to FIG. 3. FIG. 3 illustrates a flow chart of a controlling method 300 used for a wearable device according to one embodiment of the present disclosure. Also refer to FIGS. 4 to 6. FIGS. 4 to 6 respectively illustrate the relationship between different infrared reflection data and time corresponding to different force signals detected by a detection module 110 of the present disclosure.

Before accessing the controlling method 300 specifically controls the wearable device of the present disclosure, the user can preset a plurality of controlling parameters in the detection module 110 and the controller 165. Subsequently, the controlling method 300 can switch the wearable device between the active mode and the standby mode through the controller 165 according to these controlling parameters.

Specifically, in this embodiment, these controlling parameters include: a first measurement interval $TM_1$ and a second measurement interval $TM_2$, a first threshold value $TH_1$ and a second threshold value $TH_2$, a first continuous time $T_1$ and a second continuous time $T_2$.

As mentioned above, the timing unit 132 of the wearable device of the present disclosure is used for timing a plurality of measurement histories at a time interval to obtain the measurement data. In this embodiment, a single measurement history is defined as an infrared light emitted from the infrared emitter 145 and reflected until the infrared light is received by the infrared sensor 150, and the measurement data is the infrared reflection data calculated by counting down the preset value.

Therefore, in this embodiment, the controller 165 is configured to select the time interval from the first measurement interval $TM_1$ and the second measurement interval $TM_2$. The second measurement interval $TM_2$ is less than the first measurement interval $TM_1$ and corresponds to denser measurement. As such, the controller 165 has to switch between the first measurement interval $TM_1$ and the second measurement interval $TM_2$ in time to reduce power consumption.

For the infrared reflection data measured by the detection module 110, a first threshold $TH_1$ and a second threshold $TH_2$ greater than the first threshold $TH_1$ can be configured in the detection module 110 and the controller 165. As mentioned above, since the infrared reflection data is obtained by counting down the preset value, the closer the proximity sensor 140 and the elastic material 119 in the detection module 110 are, the greater the corresponding infrared reflection data value. Therefore, the greater infrared reflection data corresponds to the user wearing a wearable device, and the less infrared reflection data corresponds to the user not wearing the wearable device. It can be regarded that the user has worn the wearable device if the infrared reflection data is greater than the second threshold $TH_2$, and it can also be regarded that the user does not wear the wearable device if the infrared reflection data is less than the first threshold $TH_1$. The range between the first threshold $TH_1$ and the second threshold $TH_2$ can be used to avoid false triggering from the user.

To avoid false triggering, a first continuous time $T_1$ can also be configured by the controller 165, so that it is recognized as the corresponding user is wearing the wearable device if the infrared reflection data are greater than both of the first threshold $TH_1$ and the second threshold $TH_2$ in the first continuous time $T_1$. Similarly, a second continuous time $T_2$ can also be configured by the controller 165, so that it is recognized as the corresponding user is not wearing the wearable device if the infrared reflection data is less than the first threshold $TH_1$ in the second continuous time $T_2$.

In this embodiment, the first measurement interval $TM_1$ is set to 1 second, the second measurement interval $TM_2$ is set to 0.1 seconds, the first threshold $TH_1$ is set to 14040 (in counts), and the second threshold $TH_2$ greater than the first threshold TH1 is set to 14120 (in counts). The first continuous time $T_1$ is set to 2 seconds, and the second continuous time $T_2$ is set to 2 minutes. However, this embodiment is not limited to the present disclosure.

As shown in FIG. 3, the controlling method 300 includes operations 310 to 350. In operation 310, starting the power supply of the wearable device of the present disclosure, wherein the starting includes starting the detection module 110 and the controller 165 on the micro control board 160 as described above.

Proceed to operation 315 and after starting, put the wearable device into a standby mode.

In the standby mode, the operation 320 is entered, and the detection module 110 uses the first measurement interval $TM_1$ (1 second) as the time interval to continuously obtain infrared reflection data (measurement data). In other words, the controller 165 of the detection module 110 makes the detection module 110 measure data every 1 second to obtain the measurement data. Specifically, the infrared emitter 145 of the detection module 110 is made to emit infrared light at an interval of 1 second, and the infrared light are reflected by the elastic material 119 and received by the infrared sensor 150.

During continuously obtaining infrared reflection data (measurement data) with the first measurement interval $TM_1$ (1 second) as the time interval, enter the operation 325 to confirm whether the infrared reflection data (measurement data) is greater than the second threshold $TH_2$. If not, return to the operation 315, and the wearable device remains in the standby mode. If so, the operation 330 is entered, and the detection module 110 uses the second measurement interval $TM_2$ (0.1 second) as the time interval to obtain the infrared reflection data (measurement data) more intensively. Regarding operation 320 to operation 330, please refer to FIG. 4 for details.

As shown in FIG. 4, the vertical axis is the infrared reflection data recorded by the timing unit 132 in the countdown of the preset value, and the unit of the vertical axis is count. The horizontal axis is the time, and the unit of the horizontal axis is second.

Proceed to operation 325 and if no, there is no infrared reflection data greater than the first threshold $TH_1$ or the second threshold $TH_2$ at the 0th second. Therefore, keep the wearable device in standby mode and still use a longer first measurement interval $TM_1$ (1 second) as the time interval.

Proceed to operation 325 and if yes, the infrared reflection data is detected which is greater than the second threshold $TH_2$ at the 1st second after the first measurement interval $TM_1$ (1 second) has flied, so the time interval of the detection module 110 is switched to the second measurement interval $TM_2$ (0.1 second) to obtain the infrared reflection data at different time points more intensively.

The controller 165 can be still activated in a low power consumption mode during the standby mode. Until the operation 330 is entered, the controller 165 is switched to operate in the normal power consumption mode. Therefore, the power consumption of the controller 165 can be reduced.

Reference is made in FIGS. 3 and 4. In operation 335 and during the first continuous time $T_1$ (2 seconds), the controller 165 continuously confirms whether the infrared reflection data are all greater than the second threshold $TH_2$. If not, it is recognized as a false triggering of the user and returns to the operation 315 to keep the wearable device in the standby mode. If yes, enter to the operation 340, and switch the wearable device to the active mode.

During the active mode, enter the operation 345 to confirm whether the infrared reflection data (measurement data) is greater than the second threshold $TH_2$. If the infrared reflection data is always greater than the second threshold $TH_2$, return to the operation 340, and the wearable device maintains the active mode. If not, enter the operation 350 to confirm whether the infrared reflection data (measurement data) are all less than the first threshold $TH_1$ in the second continuous time $T_2$ (2 minutes). Please refer to FIGS. 5 and 6 corresponding to two different situations.

Reference is made in FIG. 5. In the second continuous time $T_2$ (2 minutes), although part of the infrared reflection data is less than the second threshold $TH_2$, the infrared reflection data is still maintained to be greater than the first threshold $TH_1$. Based on such situation, the controller 165 can recognize that the user may cause the infrared reflection data to be bounced due to movement, so it is determined that the wearable device is still being worn, and the active mode should be maintained. In some embodiments, some of the infrared reflection data in the second continuous time $T_2$ is less than the first threshold $TH_1$. However, the controller 165 still recognizes the user is wearing when not all of the infrared reflection data in the second continuous time $T_2$ are less than the first threshold $TH_1$. This case corresponds to the operation 350 being No, returning to the operation 340 to maintain the wearable device in the active mode.

On the contrary, reference is made in FIG. 6. In the second continuous time $T_2$ (2 minutes), if all the infrared reflection data are less than the first threshold $TH_1$, the controller 165 recognizes that the user is not wearing the wearable device. This case corresponds to the operation 350 being Yes, returning to the operation 315 to enter the standby mode again. The controller 165 is switched to the standby mode, which is the low power consumption mode, and the detection module 110 uses the first measurement interval $TM_1$ as the time interval again to obtain infrared reflection data (operation 320).

Therefore, through the controlling method 300, the wearable device of the present disclosure can recognize whether the user is wearing it through the detection module 110 and the controller 165, thereby automatically switching between the active mode and the standby mode for reducing power consumption.

Figure 7:
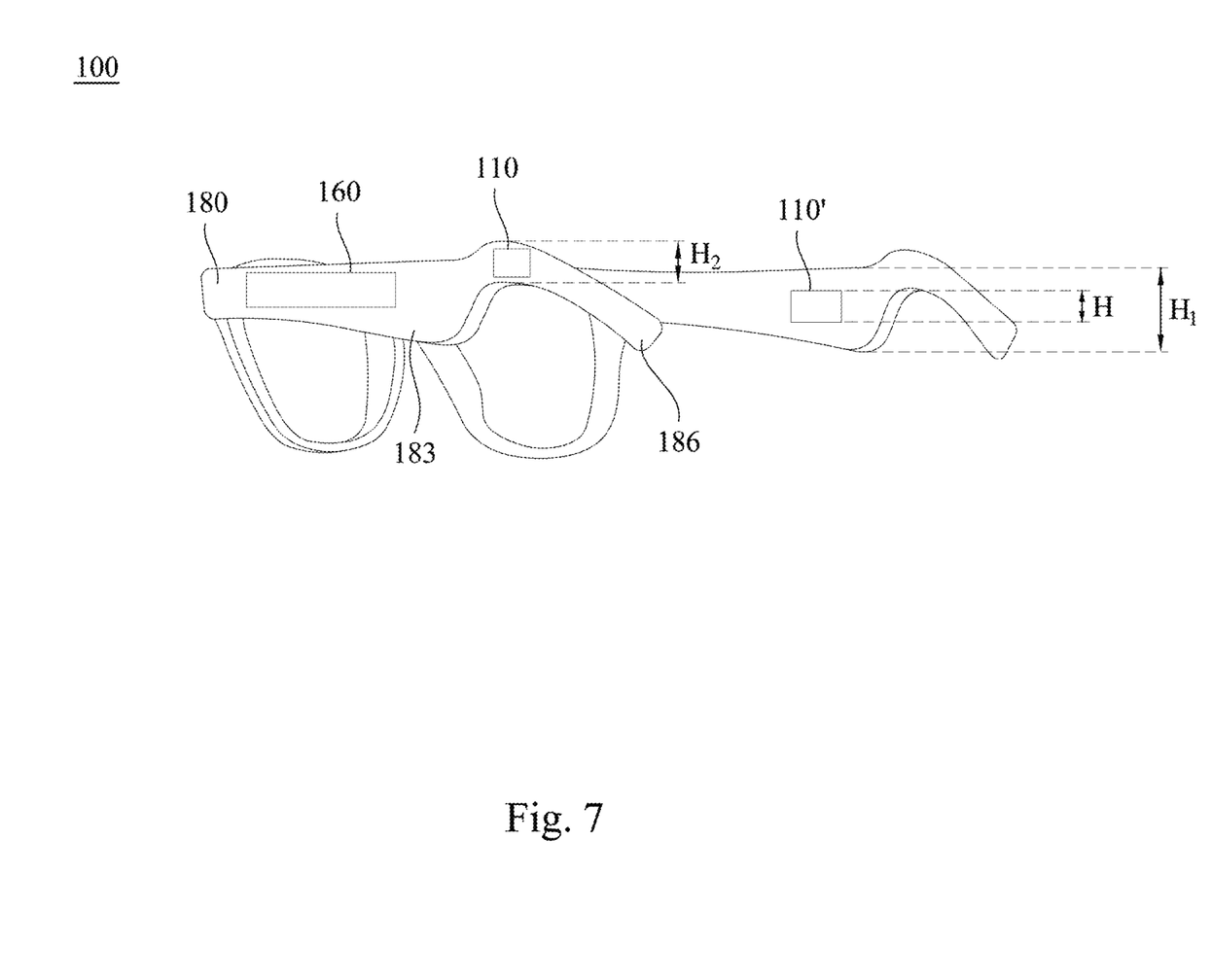
FIG. 7 illustrates a schematic view of a wearable device according to one embodiment of the present disclosure.

To further illustrate a specific example of a wearable device of the present disclosure, please refer to FIG. 7. FIG. 7 illustrates a schematic view of a wearable device 100 according to one embodiment of the present disclosure.

As shown in FIG. 7, in this embodiment, the main body provided with the detection module 110 or the detection module 110' is a glasses frame 180. The glasses frame 180 is provided for the user to wear.

In FIG. 7, the glasses frame 180 has two temples 183 arranged on both sides of the face of the user, and two temple tips 186 respectively extending from the two temples 183 to abut against the ears of the user. The detection module 110 can be arranged on one of the two temples 183 and the two temple tips 186, and the contact surface 119S of the elastic material 119 (please refer to FIG. 1A) is used to contact the skin of the user. It should be noted that FIG. 7 only schematically illustrates the location in which the detection module 110 or the detection module 110' can be located. For the purpose of simple description, the contact surface 119S of the elastic material 119 of the detection module 110 or the detection module 110' is not shown in FIG. 7. FIG. 7 only schematically illustrates the location of the detection module 110 or the detection module 110', other locations that can be in contact with the user's skin are also included in this disclosure.

In this embodiment, the glasses frame 180 can be provided with only one of the detection module 110 and the detection module 110', and the micro control board 160 is provided in the temple 183, so that the controller 165 on the micro control board 160 can be electrically connected to the detection module 110. In other words, the controller 165 can be arranged on the micro control board 160 in the temple 183 and electrically connected to the detection module 110 through a flexible circuit board. As shown in FIG. 2, other components of the micro control board 160 (including the hint light 169 and the buttons of the control interface 175, etc.) can also be exposed from the temple 183 for confirmation and operation for the user.

The detection module 110 is located at the junction of the temple 183 and the temple tip 186. When the user wears the glasses frame 180, the ears of the user would abut the junction between the temple 183 and the temple tip 186, thereby contacting the detection module 110. To contact with the ear of the user, the contact surface 119S of the elastic material 119 of the detection module 110 should be facing down, so that the contact surface 119S is exposed from the bottom of the junction and contacts the ear of the use, and the elastic material 119 is deformed by force to have a greater infrared reflection data measured by the detection module 110.

The detection module 110' is located in the temple 183. When the user wears the glasses frame 180, the face of the user would contact the temple 183. To contact with the skin of the user, the contact surface 119S of the elastic material 119 of the detection module 110' should face the face of the user, so that the contact surface 119S can contact the skin of the user.

In order to dispose the detection module 110 or the detection module 110' in the glasses frame 180 as shown in FIG. 7, the overall thickness H of the detection module 110 or the detection module 110' should be less than a thickness $H_1$ of the temple 183 or the thickness $H_2$ of the temple tip 186.

Therefore, the wearable device 100 can be used as smart glasses or wireless audio glasses, and the controlling method 300 can be realized by the detection module 110 or the detection module 110' to confirm whether the user is wearing the wearable device 110, so as to automatically switch the wearable device 110 between the active mode and the standby mode. In the active mode, the wearable device 100 can perform other main functions of the glasses, such as turning on Bluetooth or playing audio, etc. In the standby mode, the wearable device 100 can, for example, turn off the Bluetooth, stop playing audio, etc., to reduce power consumption.

Figure 8:
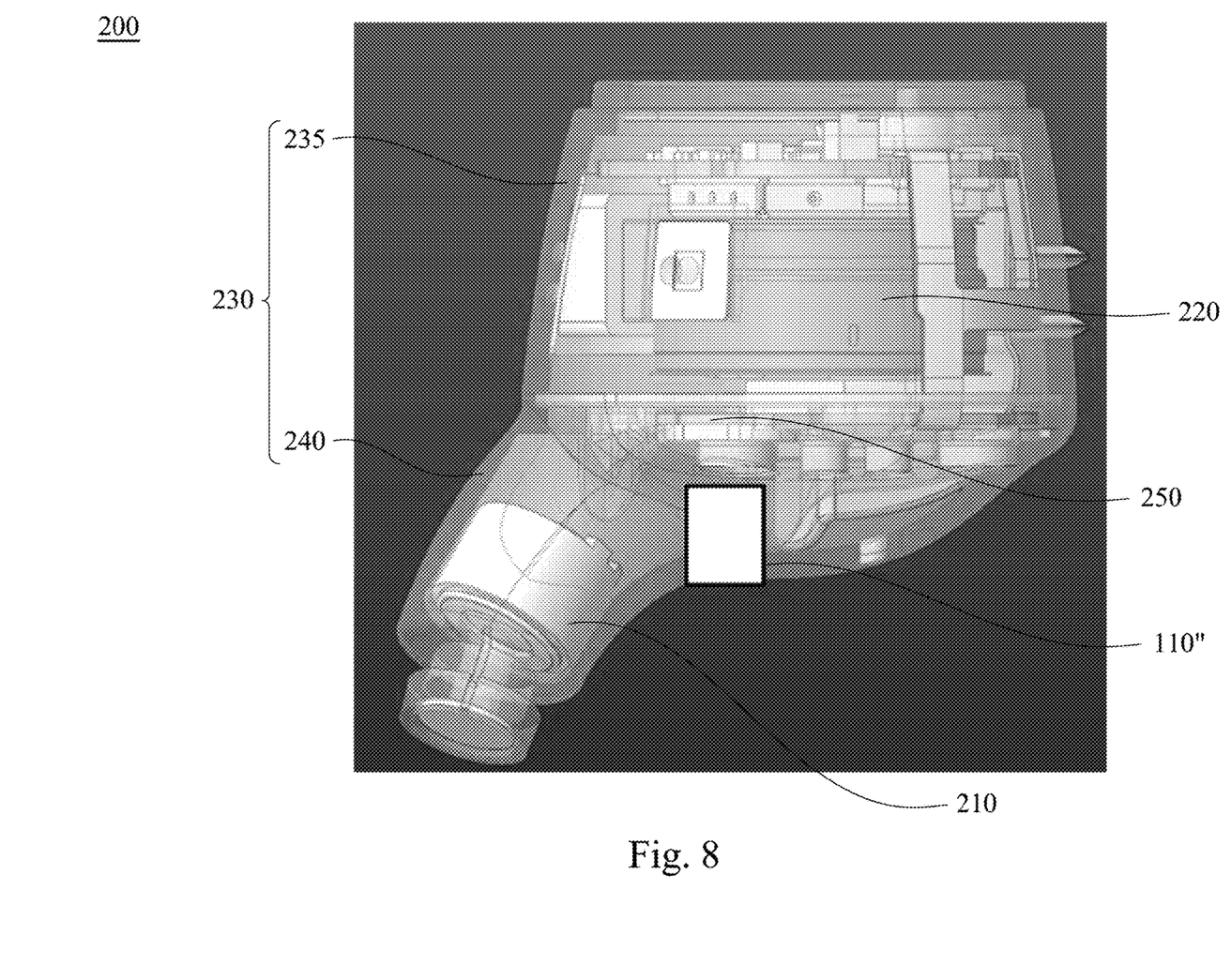
FIG. 8 illustrates a schematic view of an earbud according to one embodiment of the present disclosure.

FIG. 8 illustrates a schematic view of an earbud 200 according to one embodiment of the present disclosure. The earbud 200 is a type of wearable device of the present disclosure and is provided with a detection module 110". In some embodiments, the detection module 110" can also be similar to the detection module 110 shown in FIGS. 1A to 2 so as to be directly integrated in the earbud 200. It should be noted that FIG. 8 is only a schematic drawing of the location in which the detection module 110" is located. Other locations that can be in contact with the user are also included in the present disclosure.

As shown in FIG. 8, the earbud 200 includes a casing 230, a speaker 210, and a detection module 110". The casing 230 includes a body portion 235 and an insertion portion 240 connected to each other. The speaker 210 is installed in the insertion portion 240, and the controller 250 of the detection module 110" and the battery 220 of the earbud 200 are both disposed in the body portion 235.

In FIG. 8, the detection module 110" is located on the casing 230 and disposed at the junction of the body portion 235 and the insertion portion 240. In this embodiment, the detection module 110" includes an elastic material 119 and a proximity sensor 140 aligned with the elastic material 119. In order to contact the user, the elastic material 119 of the detection module 110" is located on the casing 230. A contact surface 119S (as shown in FIG. 1A) of the elastic material 119 is exposed outside the casing 230 and can be in contact with the user. The proximity sensor 140 of the detection module 110" can be located on a support portion in the casing 230. In some embodiments, the support portion is a hard material that can be loaded with the circuit board 130 and the proximity sensor 140. The function of the support portion is similar to the upper case 115 shown in FIG. 1A and used to support the proximity sensor 140. In some embodiments, the support portion can also be a part extending from the casing 230. For the purpose of simple description, the support portion and the contact surface 119S, etc. are not shown in FIG. 8 but only schematically indicate the position of the detection module 110" on FIG. 8. In summary, in this embodiment, the support portion of the detection module 110" in the earbud 200 can be a hard material with the circuit board 130 and the proximity sensor 140 in the casing 230. The elastic material 119 can be integrally formed on the casing 230 of the earbud 200, and the proximity sensor 140 faces the elastic material 119.

Therefore, when the user wears the earbud 200, the elastic material 119 is squeezed and approaches the proximity sensor 140, so that the distance between the elastic material 119 and the proximity sensor 140 is shortened. As mentioned above, the proximity sensor 140 can include a light emitter (such as the infrared emitter 145) and a light detector (such as the infrared sensor 150) faces the elastic material 119. As such, the controlling method 300 can be used to switch the earbud 200 between the active mode and the standby mode.

In this embodiment, the earbud 200 includes a wireless earphone, a true wireless stereo (TWS), a headset, etc., but not limited to the present disclosure. When switched to the active mode, the earbud 200 can perform main functions such as turning on the Bluetooth or playing audio, etc., and when switched to the standby mode, the earbud 200 can turn off the Bluetooth or stop playing audio, etc. to reduce power consumption.

In some embodiments, a wearable device or an earbud has two opposite surfaces on which the position of the proximity sensor 140 and the elastic material 119 can be respectively arranged is included within the scope of the present disclosure.

In summary, the present disclosure provides wearable devices, such as glasses and earbud (e.g. wireless earphone) with an improved detection module. By integrating the proximity sensor and the elastic material deformed by force, the improved detection module can easily know whether the user is wearing the wearable device. In addition, through the designed controlling method, the active mode and standby mode of the wearable device can be switched instantly, effectively reducing power consumption. By setting the first and second thresholds, it is also possible to effectively avoid false triggering of the wearable device by the user.

Although the present invention has been described in considerable detail with reference to certain embodiments thereof, other embodiments are possible. Therefore, the spirit and scope of the appended claims should not be limited to the description of the embodiments contained herein. In view of the foregoing, it is intended that the present invention cover modifications and variations of this invention provided they fall within the scope of the following claims.

What is claimed is:
1. A wearable device, comprising:
a main body;
a detection module located on the main body and comprising:
an upper casing and an opposite lower casing, wherein the lower casing has an elastic material; and
a proximity sensor located on the upper casing to measure a distance from the proximity sensor to the elastic material, wherein the proximity sensor is aligned with the elastic material; and
a controller electrically connected to the detection module, wherein the elastic material has a contact surface for a user to contact when the wearable device is worn on the user, thereby switching between an active mode and a standby mode of the wearable device,
wherein the proximity sensor has a light emitter and a light detector, the light emitter and the light detector faces the elastic material,
wherein the detection module further comprises a timing unit configured to measure a plurality of measurement times spent by a plurality of measurement histories by a time interval and correspondingly convert the measurement times to a plurality of measurement data, wherein a single one of the measurement histories is defined as a light emitted from the light emitter and reflected by the elastic material to the light detector,
wherein the detection module is configured to determine a first threshold and a second threshold greater than the first threshold to define active mode and the standby mode of the wearable device,
wherein the wearable device switches to the active mode to operate when at least one of the measurement data is greater than the second threshold, the wearable device switches to the standby mode to operate when at least one of the measurement data is less than the first threshold during the active mode,
wherein the controller is configured to determine a first continuous time and a second continuous time, the wearable device switches to the active mode when any of the measurement data are greater than the second threshold during the first continuous time, the wearable device switches to the standby mode when any of the measurement data are less than the first threshold during the second continuous time.

2. The wearable device of claim 1, wherein an elastic coefficient of the elastic material is different from an elastic coefficient of other portions of the lower casing beyond the elastic material.

3. The wearable device of claim 1, wherein the elastic material is squeezed to approach the proximity sensor when the wearable device is worn on the user, so that a distance between the elastic material and the proximity sensor is reduced.

4. The wearable device of claim 1, wherein the detection module further comprises a light reflection layer, the light reflection layer is disposed on the elastic material, and the proximity sensor is aligned with the light reflection layer.

5. The wearable device of claim 1, wherein the time interval is configured to be selected from a first measurement interval and a second measurement interval less than the first measurement interval by the controller,
wherein the controller is configured to select the first measurement interval as the time interval when the wearable device is during the standby mode,
wherein the controller is configured to select the second measurement interval as the time interval when at least one of the measurement data is greater than the second threshold during the standby mode until the wearable device switches to the standby mode from the active mode.

6. The wearable device of claim 1, wherein the main body further comprises a glasses frame which is worn on the user, and the glasses frame has two temples arranged on both sides of a face of the user and two temple tips respectively extended from the two temples to abut against ears of the user, the detection module is located on one of the two temples and the two temple tips.

7. The wearable device of claim 6, wherein an overall thickness of the detection module is less than or equal to a thickness of one of the two temples and the two temple tips.

8. The wearable device of claim 6, wherein the controller is disposed in the two temples and connected to the detection module through a flexible circuit board.

9. A wearable device, comprising:
- a main body;
- a detection module located on the main body and comprising:
  - an upper casing and an opposite lower casing, wherein the lower casing has an elastic material; and
  - a proximity sensor located on the upper casing to measure a distance from the proximity sensor to the elastic material, wherein the proximity sensor is aligned with the elastic material; and
- a controller electrically connected to the detection module, wherein the elastic material has a contact surface for a user to contact when the wearable device is worn on the user, thereby switching between an active mode and a standby mode of the wearable device,
- wherein the proximity sensor has a light emitter and a light detector, the light emitter and the light detector faces the elastic material,
- wherein the detection module further comprises a timing unit configured to measure a plurality of measurement times spent by a plurality of measurement histories by a time interval and correspondingly convert the measurement times to a plurality of measurement data, wherein a single one of the measurement histories is defined as a light emitted from the light emitter and reflected by the elastic material to the light detector,
- wherein the detection module is configured to determine a first threshold and a second threshold greater than the first threshold to define active mode and the standby mode of the wearable device,
- wherein the wearable device switches to the active mode to operate when at least one of the measurement data is greater than the second threshold, the wearable device switches to the standby mode to operate when at least one of the measurement data is less than the first threshold during the active mode,
- wherein the time interval is configured to be selected from a first measurement interval and a second measurement interval less than the first measurement interval by the controller,
- wherein the controller is configured to select the first measurement interval as the time interval when the wearable device is during the standby mode,
- wherein the controller is configured to select the second measurement interval as the time interval when at least one of the measurement data is greater than the second threshold during the standby mode until the wearable device switches to the standby mode from the active mode.

* * * * *